(12) United States Patent
Call et al.

(10) Patent No.: US 9,908,317 B2
(45) Date of Patent: Mar. 6, 2018

(54) MULTILAYER BATTERY SEPARATORS

(75) Inventors: Ronald W. Call, Rock Hill, SC (US); Donald K. Simmons, Charlotte, NC (US); Ta-Hua Yu, Nanuet, NY (US)

(73) Assignee: Celgard, LLC, Charlotte, NC (US)

( * ) Notice: Subject to any disclaimer, the term of this patent is extended or adjusted under 35 U.S.C. 154(b) by 597 days.

(21) Appl. No.: 11/744,930

(22) Filed: May 7, 2007

(65) Prior Publication Data
US 2007/0207376 A1 Sep. 6, 2007

Related U.S. Application Data

(60) Division of application No. 10/107,781, filed on Mar. 27, 2002, now abandoned, and a continuation of
(Continued)

(51) Int. Cl.
*H01M 2/18* (2006.01)
*B32B 37/28* (2006.01)
(Continued)

(52) U.S. Cl.
CPC .......... *B32B 37/28* (2013.01); *B29C 47/0026* (2013.01); *B29C 47/061* (2013.01); *B29C 47/065* (2013.01); *B29C 55/005* (2013.01); *B32B 27/32* (2013.01); *H01M 2/145* (2013.01); *H01M 2/1653* (2013.01); *H01M 2/1686* (2013.01); *H01M 2/18* (2013.01); *B29C 47/0042* (2013.01); *B29C 47/0057* (2013.01); *B29C 47/14* (2013.01); *B29C 65/18* (2013.01); *B29C 66/723* (2013.01); *B29C 66/727* (2013.01); *B29C 66/83413* (2013.01); *B29C 66/919* (2013.01); *B29C 66/9141* (2013.01); *B29C 66/91421* (2013.01); *B29C 66/91645* (2013.01); *B29C 66/91935* (2013.01); *B29C 66/929* (2013.01); *B29K 2023/06* (2013.01); *B29K 2023/065* (2013.01); *B29K 2023/0625* (2013.01); *B29K 2023/0633* (2013.01); *B29K 2023/12* (2013.01); *B29K 2105/04* (2013.01);
(Continued)

(58) Field of Classification Search
USPC .......................................... 429/142, 144, 145
See application file for complete search history.

(56) References Cited

U.S. PATENT DOCUMENTS 3,870,593 A  3/1975  Elton et al.
4,350,655 A  9/1982  Hoge
(Continued)

FOREIGN PATENT DOCUMENTS

JP  8-250097  9/1996

*Primary Examiner* — Tracy Dove
(74) *Attorney, Agent, or Firm* — Hammer & Associates, P.C.

(57) ABSTRACT

A microporous battery separator is provided having a first co-extruded multilayered portion and a second co-extruded multilayered portion. The two portions are bonded together. In a preferred embodiment, the battery separator has two substantially identical multilayered portions bonded together face-to-face. Each of the two multilayered portions has at least one strength layer and at least one shutdown layer. Methods for making the battery separators are also provided. Preferably, a tubular multilayered film is extruded, and collapsed onto itself to form a multilayered battery separator precursor. The precursor is then bonded and annealed before it is stretched to form a microporous multilayer battery separator.

24 Claims, 2 Drawing Sheets

Related U.S. Application Data application No. 09/484,184, filed on Jan. 18, 2000, now abandoned.

(51) Int. Cl.

| | |
|---|---|
| *B29C 47/00* | (2006.01) |
| *B29C 47/06* | (2006.01) |
| *B29C 55/00* | (2006.01) |
| *B32B 27/32* | (2006.01) |
| *H01M 2/14* | (2006.01) |
| *H01M 2/16* | (2006.01) |
| *B29C 47/14* | (2006.01) |
| *B29C 65/18* | (2006.01) |
| *B29C 65/00* | (2006.01) |
| *B29K 23/00* | (2006.01) |
| *B29K 105/04* | (2006.01) |
| *B29K 105/16* | (2006.01) |
| *B29K 105/00* | (2006.01) |
| *B29L 9/00* | (2006.01) |
| *B32B 37/15* | (2006.01) |
| *B32B 38/00* | (2006.01) |
| *H01M 10/42* | (2006.01) |

(52) U.S. Cl.

CPC .... *B29K 2105/16* (2013.01); *B29K 2105/256* (2013.01); *B29L 2009/00* (2013.01); *B32B 37/153* (2013.01); *B32B 38/0032* (2013.01); *B32B 2038/0028* (2013.01); *H01M 10/4235* (2013.01); *Y10T 428/31913* (2015.04)

(56) References Cited

U.S. PATENT DOCUMENTS

| | | | |
|---|---|---|---|
| 4,650,730 | A | 3/1987 | Lundquist et al. |
| 4,698,372 | A | 10/1987 | Moss |
| 4,731,304 | A | 3/1988 | Lundquist et al. |
| 4,777,073 | A | 10/1988 | Sheth |
| 5,281,491 | A | 1/1994 | Rein et al. |
| 5,565,281 | A | 10/1996 | Yu et al. |
| 5,667,911 | A | 9/1997 | Yu et al. |
| 5,691,047 | A | 11/1997 | Kurauchi et al. |
| 5,691,077 | A | 11/1997 | Yu |
| 5,731,074 | A | 3/1998 | Nishiyama et al. |
| 5,824,430 | A | 10/1998 | Higuchi et al. |
| 5,952,120 | A | 9/1999 | Yu et al. |
| 6,346,350 | B1 | 2/2002 | Call et al. |
| 6,602,593 | B1 | 8/2003 | Callahan |

MULTILAYER BATTERY SEPARATORS

RELATED APPLICATIONS

This application is a division of co-pending application Ser. No. 10/107,781 filed Mar. 27, 2002, now abandoned; which is a continuation of co-pending application Ser. No. 09/484,184 filed Jan. 18, 2000, now abandoned.

FIELD OF THE INVENTION

This invention relates to battery separators, in particular to battery separators with improved strength properties and methods for making same.

BACKGROUND OF THE INVENTION

Microporous film battery separators are used in various batteries, particularly rechargeable batteries, such as lithium batteries. Such battery separators allow electrolytes to cross through the battery separators while preventing any contact between electrodes of opposite polarity. Typically, the microporous film comprises one or more layers of microporous membranes.

In lithium batteries, particularly secondary lithium batteries (rechargeable lithium batteries), overheating problems can occur and cause thermal runaway in the battery. Thus, shutdown separators were developed to prevent thermal runaway. See e.g., U.S. Pat. No. 4,650,730 and U.S. Pat. No. 4,731,304. A shutdown battery separator has a microporous membrane that closes its pores at a temperature substantially lower than the temperature that could cause thermal runaway in the lithium battery.

Some multilayer shutdown separators are known in the art. For example, U.S. Pat. No. 4,650,730 discloses a bilayer battery separator having an unfilled microporous sheet and a filled microporous sheet. Each sheet is formed separately by an extraction process using a suitable solvent. The two microporous sheets are then laminated together to form the shutdown separator.

The Celgard® battery separators, which have been commercially available for a number of years, are typically formed by a stretch method. For example, a non-porous tubular polypropylene film is first formed by blown film extrusion. The tubular film is collapsed onto itself to form a non-porous flat sheet having two polypropylene plies. Optionally, the die assembly is rotated slowly twisting the tubular film somewhat to prevent and remove wrinkles and uneven distribution so that the surface of the film is substantially smooth. The flat sheet is then annealed and stretched to impart microporosity therein. The two microporous flat sheets are then de-plied into two layers of microporous battery separator. Normally, the adhesion force between the two plies in the flat sheet must be sufficiently low such that the two plies can be separated without damaging the plies. However, when a separator having two layers of the microporous polypropylene film is desired, the adhesion force can be higher, e.g., 5 grams/inch to about 35 grams/inch, which can be caused by, e.g., bonding the plies after collapsing the tubular film.

U.S. Pat. No. 5,691,077 discloses a trilayer battery separator. In a preferred embodiment disclosed therein, the separator has a polypropylene-polyethylene-polypropylene construction, and is made by laminating and bonding microporous layers. Each microporous layer is formed by a Celgard® process described above involving a de-plying step.

U.S. Pat. No. 5,691,047 also discloses a microporous trilayer battery separator having a polypropylene-polyethylene-polypropylene construction. A plurality of non-porous single-layered precursors are first extruded by cast extrusion. The non-porous single layers are laminated and bonded together into a precursor of a polypropylene-polyethylene-polypropylene structure. The precursor is then annealed and stretched to form a microporous trilayer battery separator.

A number of co-extrusion processes for making multilayer battery separators have also been proposed. For example, UK Patent Publication No. GB 2,298,817 describes a microporous trilayer battery separator made by co-extruding a trilayer film precursor having a non-porous polypropylene-polyethylene-polypropylene construction using a T-die, annealing the trilayer precursor, and then stretching the annealed trilayer precursor to form the porous trilayer battery separator.

A porous trilayer separator is also proposed in Japanese Patent Application No. 56320/1995 (JP8-250097A) filed by Kureha Chemical Industry Co. Ltd. The Kureha separator is prepared by a process that includes the steps of co-extruding a trilayer precursor containing a solvent extractable material as pore forming aid, and forming pores in the precursor by solvent extraction of the extractable material in the precursor.

U.S. Pat. No. 6,346,350 discloses making a multilayer battery separator by co-extrusion in a blown film process. The co-extruded molten film is rapidly quenched such that it is in a substantially solidified state. The co-extruded film is then annealed and stretched to impart microporosity therein.

A multilayer microporous shutdown separator should be as thin as possible in order to minimize the space it occupies in a battery and also to reduce electrical resistance (ER). Nevertheless the shutdown separator must also have sufficient strength to resist puncture. Punctured battery separators are ineffective in preventing the contact between the electrodes of opposite polarity. Under overheating conditions, a punctured battery separator cannot shut down effectively to prevent the electrolytes from crossing the battery separator, and thus is ineffective in preventing thermal runaway. Battery separators with low puncture strength are difficult to handle especially in the battery separator manufacturing processes. Once punctured, battery separators are prone to splitting, i.e., tearing.

Thus, it is an objective in the art to further develop efficient methods for making relatively thin battery separators with improved puncture strength.

SUMMARY OF THE INVENTION

A battery separator is a microporous film. The film has a first co-extruded multilayered portion and a second co-extruded multilayered portion. The first portion and the second portion are substantially identical. The first portion and the second portion are bonded face-to-face. The film may be formed by collapsing a tubular film onto itself.

The separator is preferably made by first extruding a tubular multilayered film. The tubular film is collapsed onto itself to form a multilayered battery separator precursor having two plies of the multilayered film. The precursor is bonded and annealed.

Then, the precursor is stretched to form a microporous multilayered battery separator.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
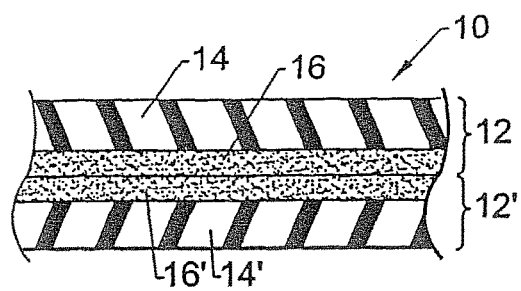
FIG. 1 is a schematic diagram showing the cross sectional view of a battery separator of this invention having four layers.

The present invention provides a microporous battery separator having two portions bonded together. Each portion contains two or more co-extruded membrane layers. To obtain greater puncture strength over the prior art, i.e., a single multilayered separator of a given thickness, the instant invention bonds at least two multilayered precursors that are sized, when combined, to have the same thickness of the prior art separator.

The battery separator can have a wide range of thickness. Preferably the battery separator has a thickness of less than 5 mils, normally no greater than 2 mils, and most preferably no greater than 1.5 mils. The puncture strength of the battery separator is at least about 400 grams, preferably at least about 450 grams. Normally, the puncture strength is at least about 500 grams, and advantageously is greater than about 550 grams.

In accordance with this invention, the membrane layers can be extruded from any compositions of film-forming polymers suitable for making battery separators, preferably polyolefins. Homopolymers, heteropolymers, such as block polymers, random copolymers and terpolymers, can all be used. Polymers should be chosen such that the battery separator made therefrom exhibits a low degree of electrical resistance and is stable in the battery environment. The polymer resin compositions may also include additives such as antioxidants, stabilizers, surfactants, and other processing aids as known in the art.

Preferably, polymers are chosen such that the battery separator exhibits shutdown properties. That is, the separator closes its pores at a temperature typically below the temperature that could cause thermal runaway in a lithium battery. Preferably, polyolefins are used including, but not limited to polyethylene, polypropylene, polybutene, ethylene-butene copolymers, ethylene-hexene copolymers, ethylene-methacrylate copolymers, and a blend thereof. Polyethylenes such as low density polyethylene (LDPE), linear low density polyethylene (LLDPE), and high density polyethylene (HDPE) can all be used. Typically, suitable polyolefins can have an average molecular weight of from about 100,000 to about 5,000,000. Normally, the battery separator of this invention exhibits shutdown properties, i.e., the micropores of the separators close at a temperature typically below the temperature that could cause thermal runaway in a lithium battery. Normally, the battery separator of this invention has a shutdown temperature, i.e., the temperature at which the battery separator closes its micropores, of from about 80° C. to about 140° C., preferably from about 100° C. to about 135° C.

As used herein, the term "microporous" means that the battery separator of this invention has micropores normally with an average pore size of about 0.005 to about 10 microns, preferably from about 0.01 to about 5 microns. Advantageously, the average pore size is from about 0.05 to about 2 microns. The battery separator of this invention typically has a Gurley value of from about 5 seconds to about 100 seconds, preferably from about 10 seconds to about 60 seconds, as measured by the method of ASTM-D726(B).

Each of the two portions of the battery separator of this invention has two or more layers that are co-extruded during the process of making the battery separator. As known in the art, co-extrusion entails simultaneously extruding two or more polymer compositions through a single die, e.g., a multimanifold internal combining die, joining the two or more layers together. Typically, the two or more polymer compositions enter the die separately and join just before they pass through the final die orifice. Upon extrusion, the multiple polymer compositions form multiple discrete layers laminated and in intimate contact with each other. Normally, the co-extruded layers become inseparable from each other without being subject to a bonding step. That is, it is normally infeasible to peel one layer away from an adjacent layer while maintaining the integrity of the layers.

Any conventional co-extrusion techniques can be used for the purpose of this invention. For example, co-extrusion can be done by melt extrusion using a T-die as is known in the art. Alternatively, co-extrusion is conducted by a blown film process, also known as blown film extrusion. In "blown film extrusion," polymer compositions are extruded from two or more extruders with an annular die to form a tubular film (or parison) having two or more layers. The tubular film or parison is then pulled away from the die and collapsed or flattened using a collapsing frame, nip rolls or the like. Normally, as the tubular film is formed, a fluid such as air is continuously blown onto the tubular film from within the parison. Thus, a bubble of air is trapped within the tubular film and between the die and the collapsing device. In addition, as the tubular film is pulled away from the die, air is also blown around the film outside surface to stabilize and quench the tubular film from the exterior. As a result, the extruded film is cooled to a substantially crystalline solid state before it is collapsed. Many conventional blown film processes are known in the art and can all be used in this invention.

Preferably, bonding takes place after each of the two portions is extruded and before they are made microporous. Typically, two multilayered non-porous flat sheets (e.g., the collapsed bubble) are bonded to form a battery separator precursor. The precursor can be bonded, and then made microporous by a conventional method known in the art to form a multilayer battery separator.

Bonding is used to make the two multilayered portions stick together (due to adhesion) so that the two portions are not readily separable and cannot be readily de-plied. Thus, the battery separator of this invention must have a minimum adhesion, which can be measured as peel strength. As used herein, "peel strength" is measured using a tension and compression tester to determine the force in grams required to separate two one-inch wide sections of bonded membrane at a peel rate of 10 inches per minute. The peel strength should be at least about 5 grams/inch, preferably at least about 8 grams/inch, and advantageously should be at least about 10 grams/inch. Methods for laminating and bonding two membranes are generally known in the art and are disclosed in, e.g., U.S. Pat. No. 5,565,281, which is incorporated herein by reference. Suitable bonding methods for use in this invention include calendaring, adhering with adhesives, and welding. The application of adhesives may include air atomizing, gravure/screen printing, hydraulic spraying, and ultrasonic spraying. The choice of adhesive and the rate of adhesive application must be chosen so that the characteristics of the battery separator formed thereof is not adversely affected. The welding technique includes thermowelding and ultrasonic welding. The amount of energy for either welding procedure and the pattern of weld should be chosen so that the separator's porosity is not adversely affected. Preferably, bonding in this invention is performed by thermocompression bonding. For example, bonding can be achieved by calendaring, with nip rolls closed, at a temperature of at least 1° C. below the melting point of the polymer in the multilayered portions, preferably at a temperature of at least 5° C. below the melting point of the multilayered portions. Normally, for precursors made of polypropylene and polyethylene, the bonding temperature ranges from about 100° C. to about 150° C., preferably from about 125° C. to about 135° C. The residence time at the bonding temperature can be up to about 30 minutes. The bonding conditions for precursors made from other polymers will be apparent to a skilled artisan apprised of the present disclosure.

The multilayered portions, separate or bonded together, can be made microporous by conventional methods known in the art for making microporous membranes, including but not limited to a stretch method, an extraction (or phase inversion) method, and a particle stretch method.

Briefly, in a phase inversion method, a microporous membrane can be formed from a composition comprising a polymer and an extractable material. The extractable material is selected such that it is miscible with the polymer at least at the melting point of the polymer. Thus, in this process, the composition is heated to the melting temperature of the polymer to form a homogenous phase. A membrane is then extruded from the homogenous liquid composition. Phase separation occurs between the polymer and the extractable material as the membrane is extruded and while the temperature is lowered down. The extractable material may be extracted from the membrane by a suitable solvent that dissolves the extractable material but not the polymer thus forming a microporous structure in the membrane. Optionally, either before or after the removal of the extractable material, the extruded membrane in the phase inversion method may be oriented or stretched beyond its elastic limit so as to impart a permanent structure of a network of interconnected micropores. Any method of stretching known in the art may be suitable for this invention. Stretching can be in the uniaxial or transverse direction. See, e.g., U.S. Pat. No. 5,281,491 and Japanese Patent Application No. 56320/1995, filed by Kureha Chemical Industry Co. Ltd. on Mar. 15, 1995, both of which are incorporated herein by reference.

By "particle stretch method" is intended a method of forming a microporous film by stretching a precursor film made from a polymer matrix filled with solid fillers dispersed therein. The stretching results in pore formation due to stress concentration, whereby the film is rendered microporous. Any particle stretch methods known in the art may be used for making this invention. Examples of such methods can be found in, for example, U.S. Pat. Nos. 3,870,593; 4,350,655; 4,698,372; and 4,777,073, all of which are incorporated herein by reference.

Preferably, the microporosity in the battery separator of this invention are imparted by a stretch method, which involves subjecting pre-formed non-porous flat sheets to uniaxial or biaxial stretching to make them microporous. Broadly speaking, the preferred stretch method includes annealing the multilayered non-porous flat sheet(s) (separate or bonded together), and subsequently stretching the annealed flat sheet(s). By way of non-limiting example, suitable methods for this purpose are disclosed in U.S. Pat. Nos. 5,565,281, 5,691,047, 5,691,077, and 5,824,430, each of which is incorporated herein by reference.

Preferably, in a stretch method, after the extrusion, the non-porous flat sheet(s) are annealed before further stretching. As generally known in the art, annealing is a heating process which improves the crystalline structure in the precursor and facilitates the micropore formation during the stretching step. Annealing can be conducted by any conventional methods. For example, the film precursor can be contacted with a heated roll or a heated metal plate, or can be heated in air or an inert gas. Alternatively, the film precursor can be wound around a core and heated in a roll form in a gaseous phase. A release sheet such as polyethylene terephthalate films, fluorine resin films, and paper or plastic films coated with, e.g., silicone resin, may be used to prevent the blocking of the film in the roll form. Typically, annealing can be performed at a temperature of from about 90° C. to about 150° C., for a time period of from about 5 minutes to about 30 minutes.

The annealed film precursor can then be stretched (or "oriented") to cause the formation of micropores in the structure of the film precursor. Typically, the annealed film precursor is uniaxially stretched in the machine direction, and optionally in the transverse direction as well. Stretching can include several steps, e.g., a cold drawing step, a hot drawing step, and a relax or heat-treating step. The relax or heat-treating step is to reduce internal stress within the separator and may be accomplished with either negative draw ratio or substantially no draw tension at various heat profiles. Stretching can be a continuous process performed in ovens containing a draw frame. The temperatures and draw ratios can be set by a skilled artisan without undue experimentation.

In a preferred embodiment, each co-extruded multilayered portion in the battery separator of this invention has at least one strength layer and at least one shutdown layer. As used herein, the term "shutdown layer" refers to a microporous membrane layer that closes its pores at the shutdown temperature of the battery separator, i.e., a relatively low temperature of from about 80° C. to about 135° C. In contrast, a "strength layer" is a microporous membrane layer that has a substantially higher melting point, e.g., above 145° C., preferably about 160° C. The strength layer typically is capable of maintaining the melt integrity of the battery separator at a relatively high temperature. Preferably, the shutdown layers in the battery separator of this invention are made of polyethylene, ethylene-butene copolymers, ethylene-propylene copolymers, ethylene-hexene copolymers, or a blend thereof. Preferably high density polyethylene (HDPE) is used. More preferred, the HDPE has a density ranging from 0.959-0.964 g/min (ASTM D792) and a MFI ranging from 0.42-0.33 dg/min @ 190° C./2.16 Kg (ASTM D1238). The strength layers in the battery separator of this invention typically are made of polypropylene or a polypropylene copolymer. Preferably, a polypropylene homopolymer having a density of about 0.905 g/cc (ASTM D1505) and a MFI of about 1.5 g/10 min @ 230° C./2.16 Kg.

In a preferred embodiment of this invention, the two multilayered portions of the battery separator are substantially identical and are bonded together face-to-face. By "substantially identical", it is intended to mean that the two bonded multilayered portions are similar to each other with respect to their physical structures and chemical compositions. As used herein, the term "face-to-face" means that the two substantially identical portions are bonded together such that the two portions are substantially symmetrically arranged in the resultant structure as shown below in reference to FIGS. 1-8.

FIGS. 1-8 are schematic diagrams illustrating the cross sections of some of the preferred embodiments of the battery separators of this invention. Each embodiment has two laminated portions that have two or more co-extruded layers. As shown in FIG. 1, battery separator 10 has two substantially identical portions 12 and 12'. The portion 12 has a co-extruded bilayer structure including a polypropylene layer 14 and a polyethylene layer 16. The portion 12' has a co-extruded bilayer structure including a polypropylene layer 14' and a polyethylene layer 16'. The portions 12 and 12' are bonded together in a face-to-face manner such that the two polyethylene layers 16 and 16' are in contact with each other.

Figure 2:
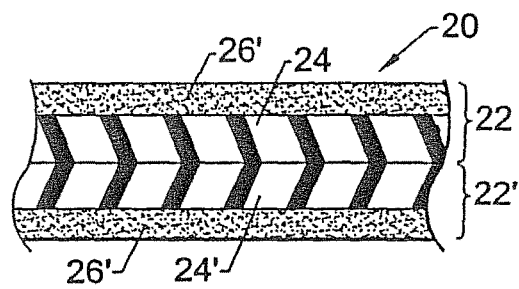
FIG. 2 illustrates the cross section of another embodiment of the battery separator of this invention having four layers.

In FIG. 2, the battery separator 20 has two portions 22 and 22', which are same as the two portions 12 and 12' in FIG. 1. However, the two portions in battery separator 20 are bonded face-to-face with the two polypropylene layers in contact with each other.

Figure 3:
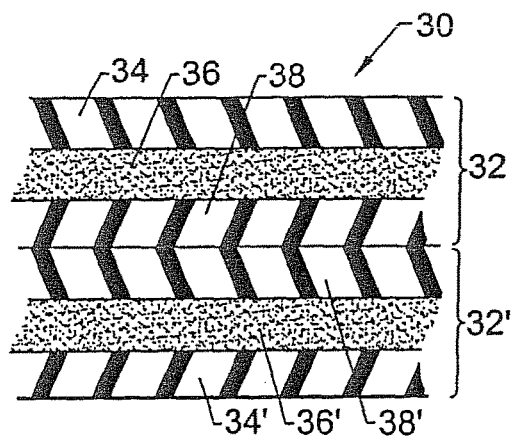
FIG. 3 is a schematic diagram demonstrating an embodiment of the battery separator of this invention having six layers.

Referring now to FIG. 3, each of the two portions 32 and 32' of separator 30 has a trilayer structure with two polypropylene layers 34 (34') and 38 (38') sandwiching a polyethylene layer 36 (36'). The two portions are bonded face-to-face such that the polypropylene layers 38 and 38' are in contact with each other.

Figure 4:
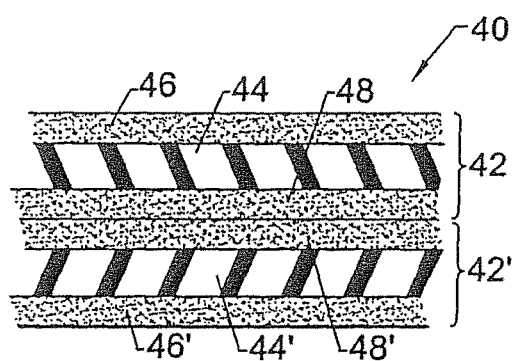
FIG. 4 shows the cross sectional view of the different construction of a battery separator of this invention having six layers.

FIG. 4 is another exemplary embodiment of the battery separator of this invention. Battery separator 40 includes two identical portions 42 and 42' bonded together. Each portion has a co-extruded trilayer construction including a polypropylene layer 44 or 44' sandwiched between two polyethylene layers 46 and 48, or 46' and 48'. The two portions are bonded face-to-face such that polyethylene layers 48 and 48' are in contact with each other.

Figure 5:
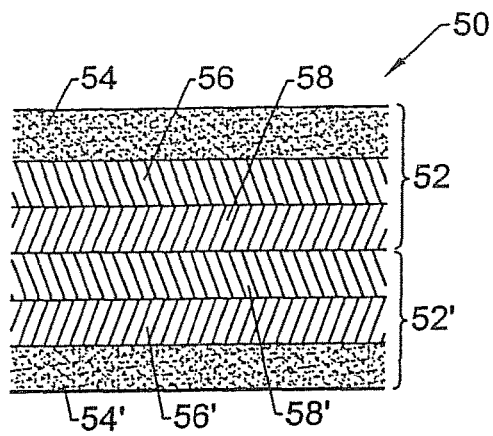
FIG. 5 illustrates the construction of another battery separator of this invention having six layers.

Referring now to FIG. 5, the battery separator 50 has two portions 52 and 52'. Each portion has a polyethylene layer (54 or 54') and two adjacent polypropylene layers (56 and 58 or 56' and 58'). The two portions are bonded together face-to-face by bonding the two polypropylene layers 58 and 58'.

Figure 6:
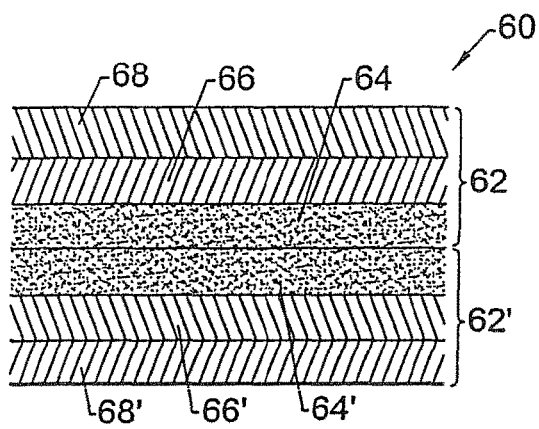
FIG. 6 is a cross sectional view of a battery separator of this invention having four outer polypropylene layers and two inner polyethylene layers.

The two portions 62 and 62' in the battery separator 60 shown in FIG. 6 are identical to the two portions in the battery separator 50 shown in FIG. 5. However, the two portions 62 and 62' are bonded together by bonding the two polyethylene layers 64 and 64' together. Thus, in battery separator 60, the first, second, fifth and sixth layers are polypropylene layers and the third and fourth layers are polyethylene layers.

Figure 7:
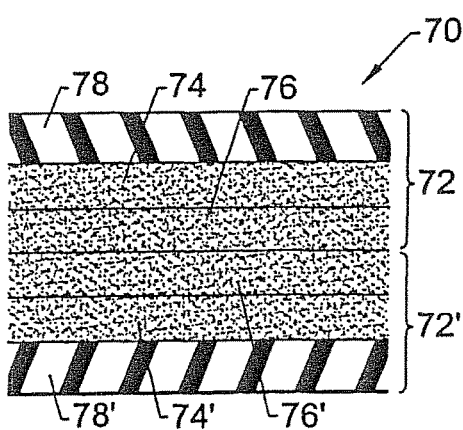
FIG. 7 is a cross sectional view of a battery separator of this invention having four inner polyethylene layers and two outer polypropylene layers.

FIG. 7 shows battery separator 70 which has a hexa-layer structure having two portions 72 and 72' bonded together. Each portion has two polyethylene layers 74 and 76 or 74' and 76' and a polypropylene layer 78 or 78'. The two portions are bonded together by bonding the two polyethylene layers 76 and 76' together.

Figure 8:
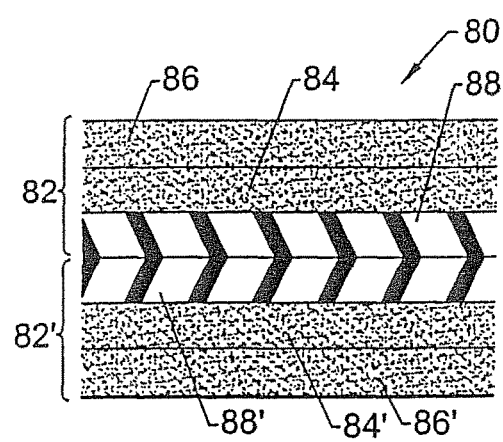
FIG. 8 illustrates a cross section of a battery separator of this invention having four outer polyethylene layers and two inner polypropylene layers.

In FIG. 8, the two portions 82 and 82' of the battery separator 80 are same as the two portions 72 and 72' in FIG. 7, except that the two portions 82 and 82' are bonded face-to-face by bonding the two polypropylene layers 88 and 88' together. Thus, the battery separator 80 has a hexa-layer structure with two inner polypropylene layers sandwiched between four polyethylene layers.

Preferably, the two multilayered portions in the battery separator of this invention are arranged in a cross-plied manner, i.e., the uniaxial orientation of one portion is at an angle relative to the uniaxial orientation of the other portion. The angle can be within the range of from about 0° to about 90°. Cross-ply can be achieved by cross-ply laminating the two multilayered portions at the time of bonding the two multilayered portions.

The battery separator precursor is then bonded and annealed. Bonding is for joining together the two laminated portions of the battery separator precursor. Bonding may be performed by passing the precursor between the heated nip rolls under a pressure exerted by the two closed nip rolls. Preferably, bonding is performed at a temperature ranging from about 100° C. to about 150° C., at about 125° C. to about 135° C. The bonding temperature is chosen so that the two layers are united and stick together to achieve in the finished battery separator a sufficient adhesion without affecting the molecular orientation in the precursor. The pressure exerted by the nip rolls can be greater than 1 pound per linear inch (pli), or from about 1 to about 3 pli, or preferably, about 1.2 to about 2.5 pli. The target adhesion is at least about 5 grams/inch, preferably at least about 10 grams/inch. Annealing of the battery separator precursor 110 can be performed at temperatures ranging from 105-150° C., preferably from about 110 to 130° C. if polyethylene-polypropylene are employed, other annealing temperatures should be used for other polymer employed.

As a result of the twisting of the tubular film, when the tubular film is collapsed onto itself to form a battery precursor, the uniaxial orientation of one portion is angularly biased against the uniaxial orientation of the other portion, and thus cross-ply lamination is achieved. A cross-ply battery separator can be obtained after the subsequent steps of bonding, annealing, and stretching as described above.

This invention is further illustrated with reference to the examples set forth below. In the following examples, Gurley is measured by the ASTM D-726(B) method. As used herein, Gurley is the resistance to air flow measured by the Gurley Densometer (e.g. Model 4120). The Gurley values set forth herein are expressed as the time in seconds required to pass 10 cc of air through one square inch of product under a pressure 12.2 inches of water.

Peel strength (adhesion) measured using a tension and compression tester to determine the force in grams required to separate two one-inch wide sections of bonded membrane. The peel rate is 10 inches/minute. Three measurements are taken across the web and averaged.

The thickness of the battery separator is measured by the T411om-83 method developed under the auspices of the Technical Association of the Pulp and Paper Industry. Thickness is determined using a precision micrometer with a ½ inch diameter, circular shoe contacting the sample at seven (7) psi. Up to 30 individual micrometer readings taken across the width of the sample are averaged.

Puncture strength is measured as follows: up to 30 measurements are made across the width of the stretched product and averaged. A Mitech Stevens LFRA Texture Analyzer is used. The needle is 1.65 mm in diameter with 0.5 mm radius. The rate of descent is 2 mm/sec and the amount of deflection is 6 mm. The film is held tight in the clamping device with a central hole of 11.3 mm. The displacement (in mm) of the film that was pierced by the needle was recorded against the resistance force (in gram force) developed by the tested film. The maximum resistance force is the puncture strength.

EXAMPLES

CE1 and CE2 are comparative examples. CE1 is a conventional trilayer battery separator having a polyethylene-polypropylene-polyethylene (PE/PP/PE) construction and prepared in a conventional manner by a blown film extrusion process. CE2 is a conventional trilayer battery separator having a PP/PE/PP construction and prepared in a conventional manner by a blown film extrusion process. CE1 and CE2 are not made the inventive technique.

E1, E1A, E2, E3, and E3A are examples of instant invention. E1 and E1A start with three layer parison, PE/PP/PE, and yields a hexa-layer product, PE/PP/PE/PE/PP/PE. E2 starts with a three layer parison, PP/PE/PP, and yields a hexa-layer product, PP/PE/PP/PP/PE/PP. E3 and E3A start with a two layer parison, PP/PE, and yields a four layer product PP/PE/PE/PP.

All examples were made in a conventional manner with conventional materials: PE-HDPE, density=0.959 g/cc (ASTM D792), MFI=0.42 dg/min @ 190° C./2.16 Kg (ASTM D 1238); and PP-isotactic PP, density=0.905 g/cc (ASTM D 1505), MFI=1.5 g/10 min @ 230° C./2.16 Kg. Product results are reported in Table 1.

TABLE 1

|  | CE1 | E1 | E1A | CE2 | E2 | E3 | E3A |
|---|---|---|---|---|---|---|---|
| Thickness (mil) | 1 | 1.2 | 1.1 | 0.83-1.05 | 1.1-1.2 | 1.1 | 1.1 |
| Gurley (Sec) | 26 | 32 | 27-28 | 25-33 | 34-44 | 30-31 | 35-36 |
| Puncture Strength (g) | 354 | 445-455 | 400-495 | 400-495 | 580-620 | 544-566 | 561-562 |
| Adhesion* (g/in) | NA | NR | 27 | NA | 10-18 | 32-40 | NR |

NA—not applicable; NR—not reported;
*adhesion is between the bonded plies, individual co-extruded layers are not separable.

Comparison of CE1 and E1, E1A shows that using the inventive technique yields a separator with significantly greater strength at equivalent thicknesses and Gurleys. Likewise, comparison of CE2 and E2, E3, E3A shows significantly greater strength at equivalent thicknesses and Gurleys.

The present invention may be embodied in other forms without departing from the spirit and the essential attributes thereof, and, accordingly, reference should be made to the appended claims, rather than to the foregoing specification, as indicated the scope of the invention.

What is claimed is:

1. A method for making a microporous multilayer battery separator consisting of the steps of:
co-extruding a tubular multilayered film, the multilayered film having at least two layers, the tubular multilayered film has a first multilayered portion and a second multilayered portion, each of the first multilayered portion and the second multilayered portion comprising at least one strength layer and at least one shutdown layer and are formed from the same tubular multilayered film;
collapsing and sticking together the first multilayered portion onto the second multilayered portion so that either the shutdown layers of the first multilayered portion and the second multilayered portion are bonded face-to-face, or the strength layers of the first multilayered portion and the second multilayered portion are bonded face-to-face;
annealing the bonded multilayered portions; and
stretching the bonded and annealed multilayered portions to form the microporous multilayer battery separator, said separator comprising at least four layers and either the shutdown layers of the first multilayered portion and the second multilayered portion are bonded face-to-face, or the strength layers of the first multilayered portion and the second multilayered portion are bonded face-to-face.

2. The method of claim 1 wherein said multilayered portions are bonded by thermocompression bonding.

3. The method of claim 1 wherein said multilayered tubular film has two layers including the shutdown layer and the strength layer.

4. The method of claim 3 wherein said strength layer consists essentially of polypropylene, and said shutdown layer consists essentially of polyethylene.

5. The method of claim 1 wherein said multilayered tubular film has three layers including two strength layers sandwiching the shutdown layer.

6. The method of claim 5 wherein said strength layer consists essentially of polypropylene, and each said shutdown layer consists essentially of polyethylene.

7. A method for making a multilayer microporous battery separator consisting of the steps of:
co-extruding a first portion of a tubular parison and a second portion of the tubular parison, the first portion and the second portion are formed from the same tubular parison, the first portion becomes a first multilayered flat sheet and the second portion becomes a second multilayered flat sheet, each of the first portion and the second portion comprising at least one strength layer and at least one shutdown layer;
collapsing with sticking said first multilayered flat sheet and said second multilayered flat sheet to form a battery separator precursor prior to annealing and stretching said precursor, where either the shutdown layers of the first multilayered portion and the second multilayered portion are bonded face-to-face, or the strength layers of the first multilayered portion and the second multilayered portion are bonded face-to-face, an adhesion between the bonded layers is at least 10 grams/inch;

annealing said battery separator precursor; and stretching the bonded and annealed precursor to form the multilayer microporous battery separator, the multilayer microporous battery separator either the shutdown layers of the first multilayered portion and the second multilayered portion are bonded face-to-face, or the strength layers of the first multilayered portion and the second multilayered portion are bonded face-to-face.

8. The method of claim 7 where said first multilayered flat sheet and said second multilayered flat sheet are substantially identical.

9. The method of claim 8 where said first multilayered flat sheet and said second multilayered flat sheet are bonded face to face.

10. A method for making a microporous multilayer battery separator consisting of the steps of:

co-extruding a first portion of a tubular parison and a second portion of the tubular parison, the first portion and the second portion are formed from the same tubular parison, the first portion becomes a first multilayered flat sheet and the second portion becomes a second multilayered flat sheet;

collapsing with sticking said first multilayered flat sheet and second multilayered flat sheet to form a battery separator precursor, where either the shutdown layers of the first multilayered portion and the second multilayered portion are bonded face-to-face, or the strength layers of the first multilayered portion and the second multilayered portion are bonded face-to-face;

annealing said battery separator precursor;

stretching the bonded and annealed precursor to form a microporous multilayer battery separator;

wherein said microporous multilayer battery separator has a total of four or more layers, and said separator having either the shutdown layers of the first multilayered portion and the second multilayered portion are bonded face-to-face, or the strength layers of the first multilayered portion and the second multilayered portion are bonded face-to-face.

11. The method of claim 10 wherein said first multilayered flat sheet and said second multilayered flat sheet contain solid fillers distributed through a polymer matrix and wherein said stretching is a particle stretch process.

12. The method of claim 10 wherein said precursor is bonded by thermocompression bonding.

13. The method of claim 10 wherein each of said first and second multilayered flat sheet has two layers including a shutdown layer and a strength layer.

14. The method of claim 13 wherein said strength layer consists essentially of polypropylene, and said shutdown layer consists essentially of polyethylene.

15. The method of claim 10 wherein each of said first and second multilayered flat sheet has three layers including two strength layers sandwiching a shutdown layer.

16. The method of claim 15 wherein said strength layer consists essentially of polypropylene, and each said shutdown layer consists essentially of polyethylene.

17. The method of claim 10 where said first multilayered flat sheet and said second multilayered flat sheet are substantially identical.

18. The method of claim 17 where said first multilayered flat sheet and said second multilayered flat sheet are bonded face to face.

19. The method of claim 1, wherein an adhesion between the bonded layers is at least 5 grams/inch.

20. The method of claim 1, wherein an adhesion between the bonded layers is at least 10 grams/inch.

21. The method of claim 1, wherein an adhesion between the bonded layers is greater than 10 grams/inch.

22. The method of claim 1 wherein said stretching is a dry stretch process.

23. The method of claim 7 wherein said stretching is a dry stretch process.

24. The method of claim 10 wherein said stretching is a dry stretch process.

* * * * *